(12) United States Patent
Blaettler et al.

(10) Patent No.: US 9,442,661 B2
(45) Date of Patent: Sep. 13, 2016

(54) MULTIDIMENSIONAL STORAGE ARRAY AND METHOD UTILIZING AN INPUT SHIFTER TO ALLOW AN ENTIRE COLUMN OR ROW TO BE ACCESSED IN A SINGLE CLOCK CYCLE

(71) Applicant: INTERNATIONAL BUSINESS MACHINES CORPORATION, Armonk, NY (US)

(72) Inventors: Tobias Blaettler, Maur (CH); Charles J. Camp, Sugar Land, TX (US); Thomas Parnell, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 14/100,883

(22) Filed: Dec. 9, 2013

(65) Prior Publication Data
US 2015/0160867 A1     Jun. 11, 2015

(51) Int. Cl.
*G06F 3/06* (2006.01)
*G06F 11/14* (2006.01)
*G06F 12/00* (2006.01)
*G06F 7/78* (2006.01)

(52) U.S. Cl.
CPC .......... *G06F 3/0613* (2013.01); *G06F 3/0619* (2013.01); *G06F 3/0638* (2013.01); *G06F 3/0689* (2013.01); *G06F 11/14* (2013.01); *G06F 7/785* (2013.01)

(58) Field of Classification Search
CPC .. G06F 3/0613; G06F 3/0619; G06F 3/0638; G06F 3/0665; G06F 3/0689; G06F 11/14; G06F 7/785
See application file for complete search history.

(56) References Cited

U.S. PATENT DOCUMENTS

| | | | | |
|---|---|---|---|---|
| 4,094,009 A | * | 6/1978 | Schneider | G11C 19/287 257/239 |
| 4,164,031 A | | 8/1979 | Lou et al. | |
| 4,667,308 A | * | 5/1987 | Hayes | G06F 12/0207 365/230.02 |
| 4,799,149 A | * | 1/1989 | Wolf | G06F 7/24 707/E17.043 |
| 5,490,264 A | | 2/1996 | Wells et al. | |
| 5,668,772 A | | 9/1997 | Hotta | |
| 8,433,976 B1 | | 4/2013 | Demirsoy | |
| 8,493,912 B2 | | 7/2013 | Ko et al. | |
| 2006/0218341 A1 | * | 9/2006 | Nolte | G11C 19/38 711/109 |
| 2010/0077176 A1 | * | 3/2010 | Pearlstein | G06F 7/785 712/22 |

FOREIGN PATENT DOCUMENTS

CN         101227195 A      7/2008

* cited by examiner

*Primary Examiner* — Tuan Thai
*Assistant Examiner* — Glenn Gossage
(74) *Attorney, Agent, or Firm* — Matthew C. Zehrer

(57) ABSTRACT

A multidimensional storage array includes independently addressable storage elements and an input shifter. The storage elements are physically arranged into rows and columns and store particular bit(s) of a data word. The input shifter implements a circular shift to serially loaded data words to the multidimensional storage array. An output shifter may reverse the circular shift of a requested data word. The data entering the storage array may be shifted to expose column addressed data such that an entire column or columns may be fed to a requesting device in a single hardware clock cycle and/or may be shifted to expose row addressed data such that an entire row or rows may be fed to the requesting device in a single hardware clock cycle. The data entering the storage array may be shifted such that column addressed data words may be stored in a plurality of diagonally arranged storage elements.

9 Claims, 12 Drawing Sheets

MULTIDIMENSIONAL STORAGE ARRAY AND METHOD UTILIZING AN INPUT SHIFTER TO ALLOW AN ENTIRE COLUMN OR ROW TO BE ACCESSED IN A SINGLE CLOCK CYCLE

FIELD

Embodiments of the present invention generally relate to storage systems and storage devices, and more particularly to a multidimensional storage array.

DESCRIPTION OF THE RELATED ART

Storage controllers, microprocessors, and other data processing devices often operate on data organized as an array of multiple rows and columns—a multidimensional storage array. In various applications, it may be desirable to access data corresponding to a particular row or access data corresponding to a particular column. One exemplary application may be iterative error correction schemes, e.g. Turbo Codes, etc. for modern Flash memory devices that exhibit errors when data is retrieved from the memory devices. These error correction techniques often require data to be processed as a two dimensional array with high-speed access to both rows and columns. To deliver high performance, the processing of data in multiple dimensions requires that the data be transposed with low overhead. However, traditional access techniques, e.g. storing the data in a traditional random access memory device, do not deliver the level of throughput required for correcting data at high bandwidths.

SUMMARY

In a first embodiment of the present invention, a multidimensional storage array includes a plurality of independently addressable storage elements physically arranged in a plurality of rows and a plurality of columns that store particular bit(s) of a data word, an input shifter that imparts a circular shift to received data words to be serially loaded to the multidimensional storage array at a storage array input interface; and a storage array output interface to unload data words from the multidimensional storage array.

In another embodiment, a multidimensional storage array access method includes serially receiving, with an input shifter, a plurality of data words; circularly shifting, with the input shifter, the serially received data words; loading the circularly shifted data words to a multidimensional storage array via a storage array input interface, reversing, with an output shifter, the circular shift of a requested data word; and unloading the requested data word from the multidimensional storage array via a storage array output interface.

In another embodiment a computer program product for accessing a multidimensional storage array includes a computer readable storage medium having program code embodied therewith, the program code executable to serially receive, with an input shifter, a plurality of data words; circularly shift, with the input shifter, the serially received data words; load the circularly shifted data words to a multidimensional storage array via a storage array input interface, reverse, with the output shifter, the circular shift of the requested data word; and unload the requested data word from the multidimensional storage array via a storage array output interface.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
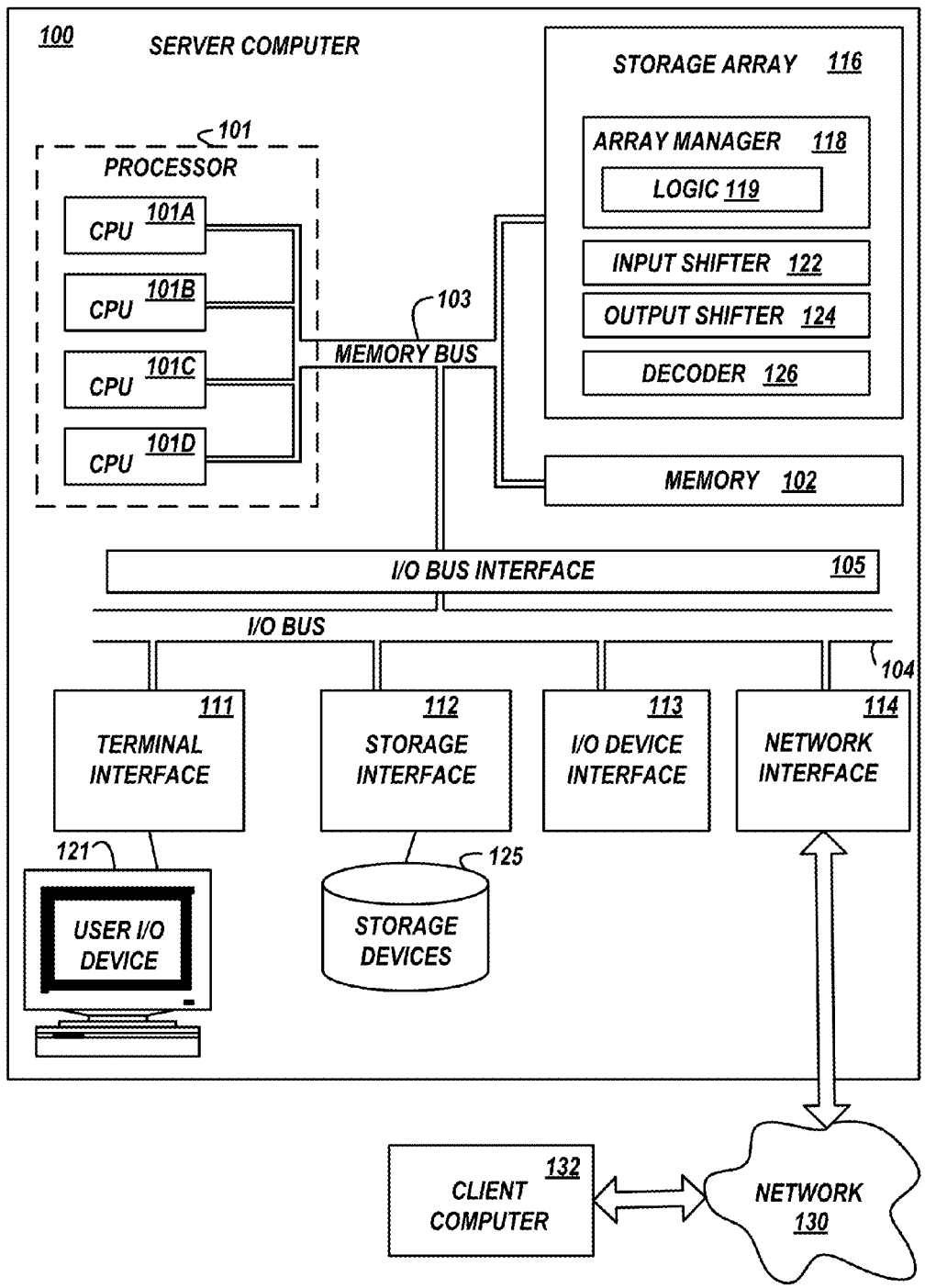
FIG. 1 depicts an exemplary data handling system, according to various embodiments of the present invention.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "device," "manager" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java®, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)). Additionally, the code for carrying out operations for various embodiments of the present invention may be written in a hardware description language such as Verilog or VHDL, and may be compiled to a field programmable gate array (FPGA), application-specific integrated circuit (ASIC), full custom semiconductor device, or any other hardware device capable of implementing the operations described by the hardware description language. The code may also be written in a combination of a software programming language and a hardware description language, with various aspects of an implementation being handled by software and hardware.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The drawings are not necessarily to scale. The drawings are merely schematic representations, not intended to portray specific parameters of the invention. The drawings are intended to depict only exemplary embodiments of the invention. In the drawings, like numbering represents like elements.

FIG. 1 depicts an exemplary data handling system, according to various embodiments of the present invention. For example, FIG. 1 depicts a high-level block diagram representation of a server computer 100 connected to a client computer 132 via a network 130. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The computer 100, which may be referred to herein as simply computer 100, may include one or more processors 101, a memory 102, a terminal interface 111, a storage interface 112, an I/O (Input/Output) device interface 113, a network adapter or interface 114, and/or a multidimensional storage array 116, all of which are communicatively coupled, directly or indirectly, for inter-component communication via a memory bus 103, an I/O bus 104, and an I/O bus interface unit 105.

The computer 100 may contain one or more general-purpose programmable central processing units (CPUs) 101A, 101B, 101C, and 101D, herein generically referred to as processor 101. In an embodiment, the computer 100 contains multiple processors typical of a relatively large system; however, in another embodiment the computer 100 may alternatively be a single CPU system. Each processor 101 may execute instructions stored in the memory 102 and/or stored in storage array 116 and may comprise one or more levels of on-board cache.

In an embodiment, the memory 102 may comprise a random-access semiconductor memory, storage device, or storage medium for storing or encoding data and programs. In another embodiment, the memory 102 represents the entire virtual memory of the computer 100, and may also include the virtual memory of other computer systems coupled to the computer 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

In an embodiment, storage array 116 may comprise a multidimensional array in which data may be organized into multiple rows and columns. In various implementations, storage array 116 may be a FPGA, ASIC or other custom integrated circuit, etc. Generally, storage array 116 may be a storage device that stores wide, very wide, etc. data words within the multidimensional array.

In certain embodiments storage array 116 is included in storage device 125 that may be accessed by processor 101 via, e.g. storage interface 112 and/or included in a storage system that may be accessed by computer 100 via, e.g. network 130, etc.

In certain embodiments, storage array 116 includes an array manager 118 that manages unloading, loading, and accessing of data to or from storage array 116. Array manager 118 may be a physical hardware component (e.g. semiconductor devices, chips, logical gates, circuits, etc.) of the FPGA, ASIC, or custom IC and/or a management routine (e.g. logic 119, etc.) that is executed by the FPGA, ASIC, custom IC, processor 101, etc. to carry out the functions as further described below. In certain embodiments, storage array 116 includes an input shifter 122 and an output shifter 124 to carry out the functions as further described below. Though shown as conceptually distinct entities, in some implementations, the input shifter 122 and output shifter 124 may be a single entity. Further, in certain embodiments, storage array 116 may include one or more error correction code devices (e.g. decoder 126, encoder, etc.) or logic module for performing error correction upon the data stored in the multidimensional array.

Though shown as components of storage array 116, in certain embodiments, array manager 118, input shifter 122, output shifter 124, etc. may be distinct from storage array 116 and included in other devices in communication with storage array 116. For example, in certain embodiments array manager 118 may be a distinct ASIC, FPGA, etc. in communication with storage array 116. In certain other embodiments, the functionality of array manager 118, input shifter 122, output shifter 124, etc. may be carried out by processor 101, etc.

The memory bus 103 provides a data communication path for transferring data among the processor 101, the memory 102, the storage array 116, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (e.g. rotating magnetic disk drive storage devices, arrays of disk drives configured to appear as a single large storage device to a host computer, Flash memory storage devices, etc.). In another embodiment, the storage devices 125 may be implemented as any type of secondary storage device. The contents of the memory 102 and/or storage array 116, or any portion thereof, may be stored to and retrieved from the storage devices 125, as needed. The I/O device interface 113 provides an interface to any of various other input/output devices or devices of other types, such as printers or fax machines. The network adapter or interface 114 provides one or more communications paths from the computer 100 to other digital devices and client computer 132; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the computer 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer 100 is a multi-user mainframe computer system, a single-user system, or a server computer or similar device that has little or no direct user interface, but receives requests from other computer systems (clients). In other embodiments, the computer 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer 100 and client computer 132. In various embodiments, the network 130 may represent a storage device or a combination of storage devices, either connected directly or indirectly to the computer 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented as a intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer 132 may comprise some or all of the hardware and computer program elements of the server computer 100. The client computer 132 may also comprise additional elements not illustrated for the server computer 100.

FIG. 1 is intended to depict representative components of the server computer 100, the network 130, and the client computer 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
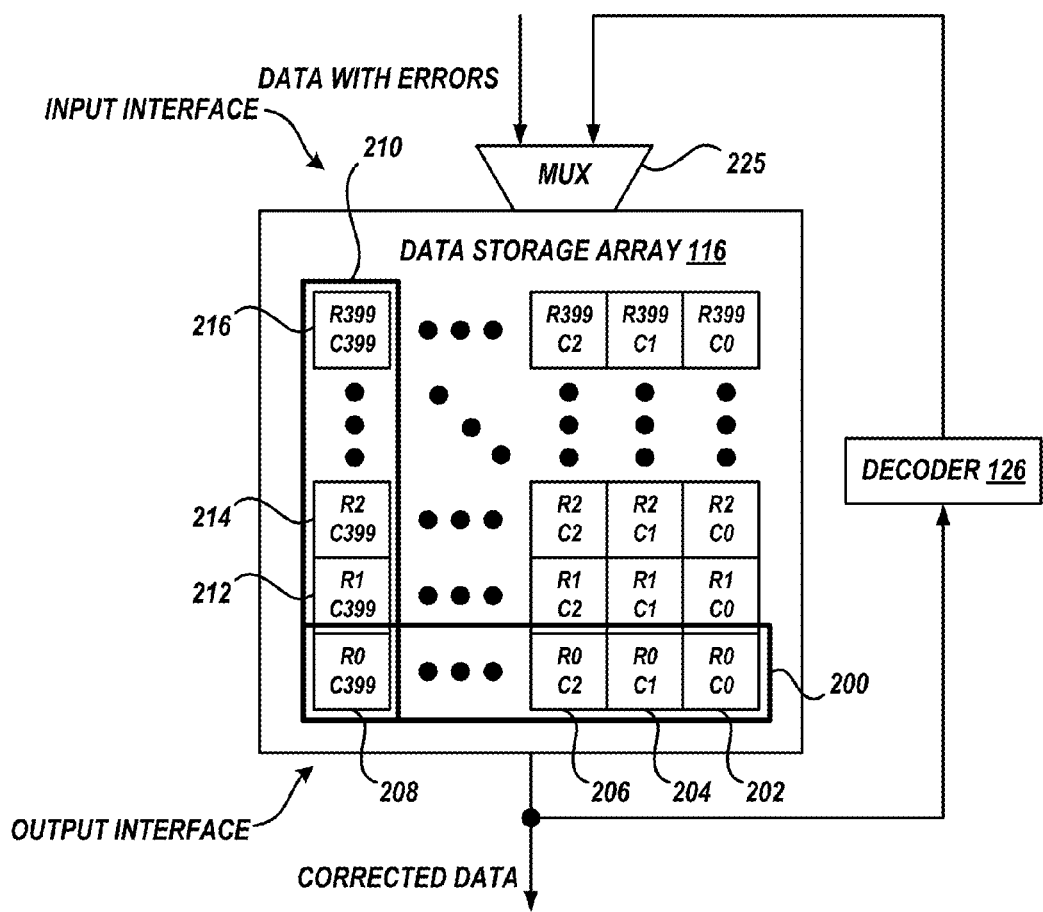
FIG. 2 depicts an exemplary multidimensional storage array including horizontal and vertical data words.

FIG. 2 depicts an exemplary multidimensional storage array 116 including horizontal and vertical data words. Storage array 116 may comprise a multidimensional array in which storage elements that store data may be organized into multiple rows and columns. The storage array 116 may include a plurality of storage elements 202, 204, 206, 208, 212, 214, 216, etc. that store data. The storage elements may be arranged such that some of the storage elements 202, 204, 206, and 208 together store a row orientated or oriented data word addressed by R0 and some of the storage elements 208, 212, 214, and 216 together store a column orientated data word addressed by C399. Data stored addressed by R0 forms a horizontal data word 200 and data addressed by C399 forms a vertical data word 210. In certain embodiments, as shown in FIG. 2, data word 200 may be physically orthogonally arranged to data word 210. Each storage element may have a unique address made up of a row identifier and a column identifier. For example, storage element 206 may store data with an address that contains a row identifier R0 and column identifier C2. Though shown having 400 rows and 400 columns, storage array 116 may include greater or fewer rows and columns as appropriate. Generally, embodiments of the present invention are advantageously utilized when the number of rows and columns are large, making traditional memories (e.g. DRAM, etc.) inefficient.

In various embodiments of the present invention, a single data bit may be stored within an individual storage element. However, in other embodiments, multiple data bytes may be stored within an individual storage element. For example, a particular storage element may be able to store 8 bytes of data.

In certain embodiments, data words may be unloaded from storage array 116 and fed to a requesting device in quantities of single rows or columns. For example, in high performance applications, a row or column respectively is fed to the requesting device in its entirety during a single hardware clock cycle. In another example, in maximum performance applications, multiple rows or multiple columns in their entirety, respectively, may be fed to the requesting device simultaneously.

In traditional data arrays, if data is organized to read data arranged in rows, then access to data arranged in the orthogonal dimension is inefficient. Further, if data is organized for efficient column access, access to the orthogonal dimension is also inefficient. For example, data array 116 may be arranged for efficient row access where data word 200 may be accessed in a single hardware clock cycle. However, to access data word 210, multiple clock cycles would be needed if the elements making up data word 210 are not also simultaneously accessible in a single clock cycle. In other words, storage element 208 associated with R0C399 is the only storage element of data word 210 (column C399) exposed to an output interface of storage array 116. Thus, it may take multiple hardware clock cycles for the entire data word 210 to be unloaded via the exposed storage element 208 to the output interface. Thus, it is an object of the various embodiments of the present invention to improve the efficiency of accessing data words organized in multiple dimensions.

In certain embodiments, storage array 116 is populated from a Flash memory device. For example, storage array 116 may be loaded with data retrieved from a NAND flash storage device 125 in FIG. 1, a Solid State Drive (SSD) device, etc. In certain embodiments, data unloaded from storage array 116 may be delivered to a requesting device, e.g. a decoder 126. For example, in a particular error correction scheme, each row of storage array 116 may be fed to decoder 126 and each row is returned to the array with corrections. After the rows are processed by decoder 126, each column may be processed similarly. Correction of all errors may require several iterations of row and column processing. In certain other embodiments, storage array 116 may be populated by processor 101 and the requesting device may also be processor 101.

In certain embodiments a multiplexer 225 may be utilized to select one of several input signals and forward the selected input signal to array 116 or input shifter 122. For example, multiplexer may select either data with errors or decoded data from decoder 126 and forward the selected data with errors or decoded data to the array 116 or input shifter 122, as shown in FIGS. 2-5.

In various embodiments, storage array 116 may be comprised within a NAND flash storage device 125, comprised within a storage controller device that resides within NAND flash storage device 125, etc.

Figure 3:
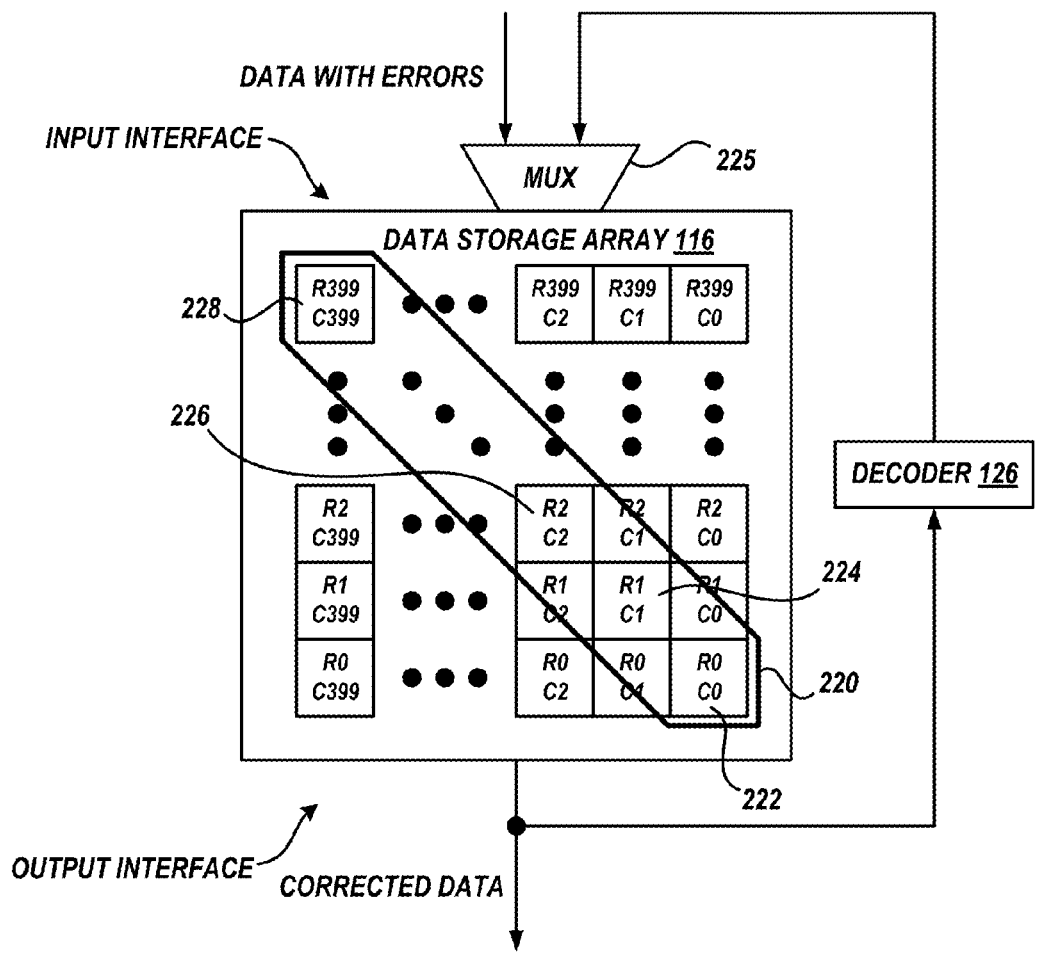
FIG. 3 depicts an exemplary multidimensional storage array including a diagonal data word.

FIG. 3 depicts an exemplary multidimensional storage array 116 including a diagonal data word. In certain embodiments, storage array 116 may include storage elements 222, 224, 226, 228, etc. that are independently addressable. For example, supplying a similar row identifier (e.g. storage elements in the same physical horizontal, etc.) results in a complete row access and staggering identifiers across the storage array 116 can provide other access types, such as a diagonal word 220. Independent addressing alone, however, does not solve the problem of achieving efficient accesses of multidimensional data words. For example, if multiple bits of data are stored within a similar storage element, an entire column may not be accessed from the array in a single hardware clock cycle even if the storage elements are independently addressable.

Figure 4:
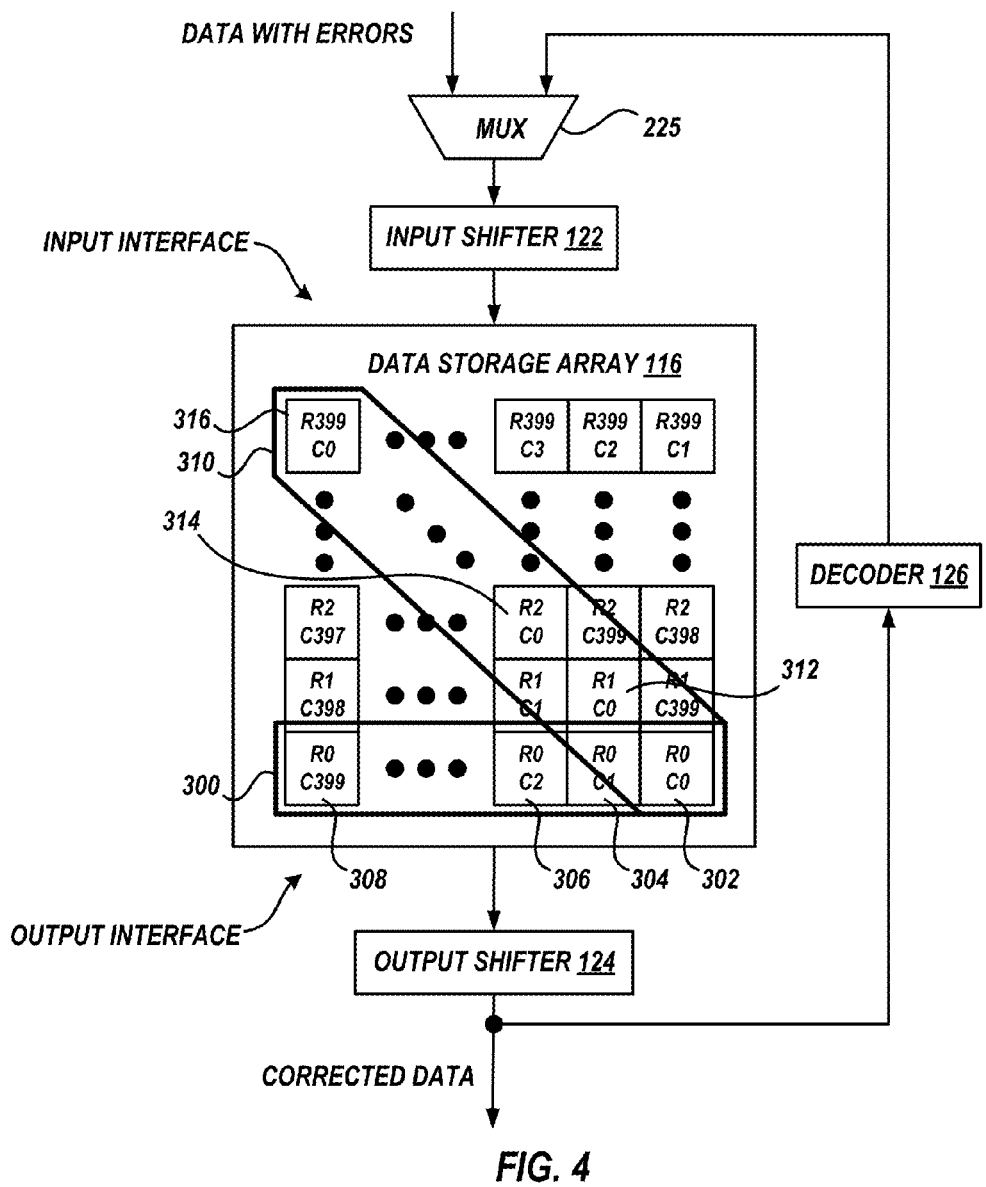
FIG. 4 and FIG. 5 depict exemplary multidimensional storage arrays including an input shifter and output shifter, according to various embodiments of the present invention.

FIG. 4 depicts an exemplary multidimensional storage array 116 including an input shifter 122 and output shifter 124, according to various embodiments of the present invention. In certain embodiments, data entering array 116 is shifted by input shifter 122 and data exiting storage array 116 is shifted by output shifter 124. In certain embodiments, input shifter 122 may implement a circular shift, bitwise rotation, variable length serial shift, etc.

In certain embodiments, storage array 116 may comprise input shifter 122, output shifter 124, and storage elements that are independently addressable to achieve efficient access of multidimensional data words. For example, the storage array 116 may include a plurality of storage elements 302, 304, 306, 308, 312, 314, 316, etc. that together store data. The storage elements may be arranged such that the storage elements 302, 304, 306, and 308 store a row addressed data word at R0 and some of the storage elements 302, 312, 314, and 316 form a column addressed data word at C0. Data stored with an address that contains row identifier R0 forms a data word 300 and data stored with an address that contains column identifier C0 form a data word 310. In certain embodiments, as shown in FIG. 4, data word 300 is organized in a dissimilar dimension relative to data word 310. In certain embodiments, accessing vertical storage elements across storage array 116 with similar vertical identifiers delivers particular rows and/or accessing diagonal storage elements across storage array 116 delivers particular columns.

In certain embodiments, the data entering storage array 116 is shifted to expose each column storage element of an associated row, such that an entire column may be fed to the requesting device in a single hardware clock cycle. In certain embodiments, the data entering storage array 116 is shifted such that an entire row may still be fed to the requesting device in a single hardware clock cycle. Still in certain embodiments, the data entering storage array 116 is shifted such that an entire column or an entire row may be fed to the requesting device in a single hardware clock cycle.

Data exiting storage array 116 is shifted by output shifter 124 such that the lowest order bit(s) within the output word is located in the lowest order position. In certain implementations, the output shifter 124 un-shifts a particular data word to be organized as it was prior to being shifted by input shifter 122. In other words, output shifter 124 may reverse the shift performed by input shifter 122.

In certain embodiments, data word 310 may be read by physically addressing across a diagonal of storage array 116 and may be un-shifted to obtain a column addressed word in a single clock cycle and/or data word 300 may be read by physically addressing across a horizontal of storage array 116 and may be un-shifted to obtain a row addressed data word in a single clock cycle.

Figure 5:
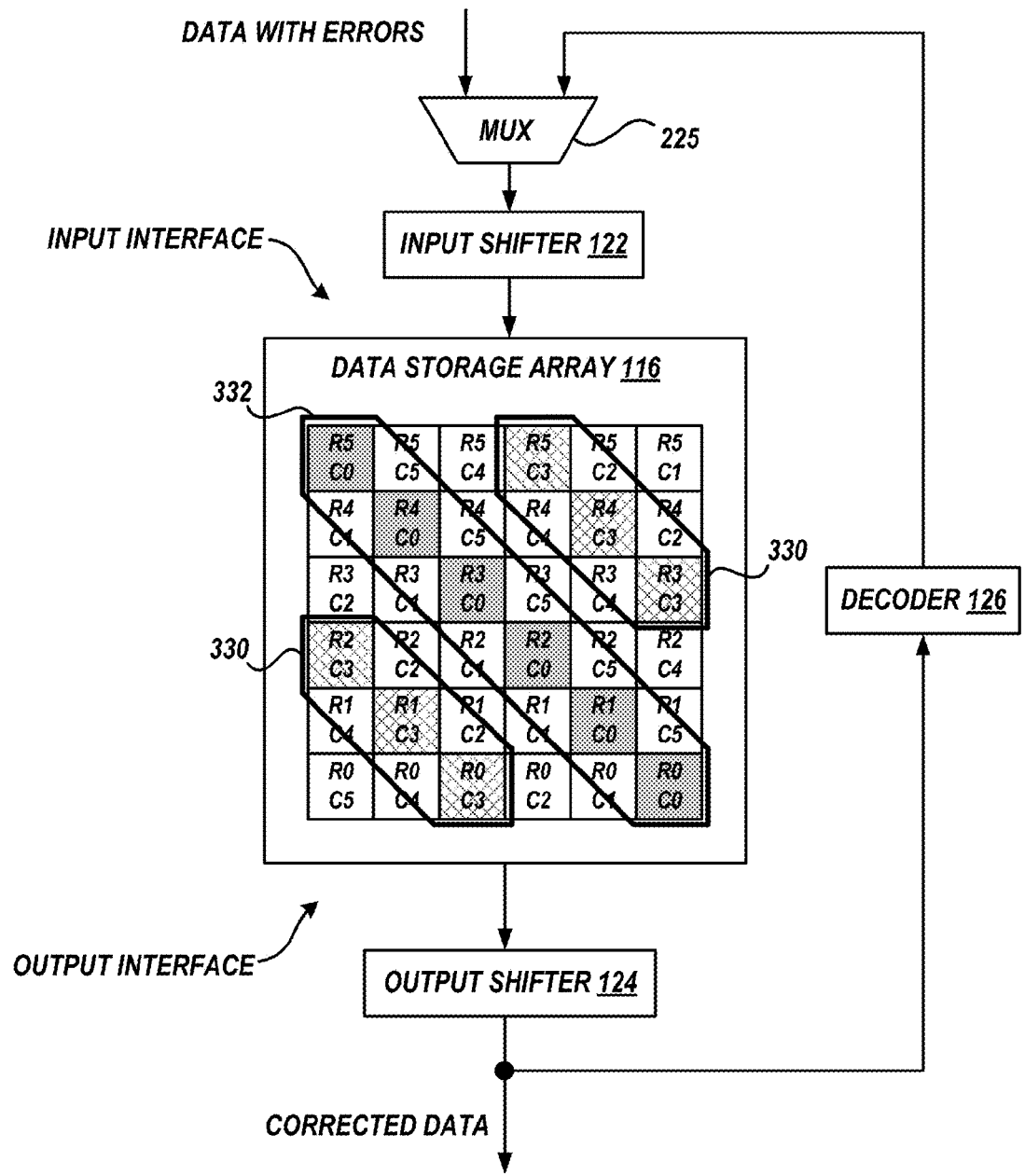

FIG. 5 depicts an exemplary multidimensional storage array 116 including an input shifter 122 and output shifter 124, according to various embodiments of the present invention. In certain embodiments storage array 116 may support simultaneous loading of data into and out of the array 116. For example, data word 332 associated with column identifier C0 that may have been previously read from storage array 116 is being loaded back to storage array 116 via an input interface at the same time data word 330 associated with column identifier C3 is being unloaded from storage array 116 via the output interface.

To achieve simultaneous loading and unloading, storage array 116 may be a dual ported memory structure with independent write and read capability. As such, within vertical storage elements, data may be unloaded at one word address via the output interface while different data is loaded to a different word address via the input interface.

Simultaneous loading and unloading of storage array 116 may be useful when the requesting device is decoder 126, as simultaneous loading and unloading may improve latency imposed by the decoder 126. The number of hardware clock cycles required to correct data in decoder 126 may be relatively high. Therefore, to improve latency of the overall system, row addressed data words and/or column addressed data words may be unloaded from storage array 116 simultaneously with the loading of data words returning from decoder 126.

Figure 6:
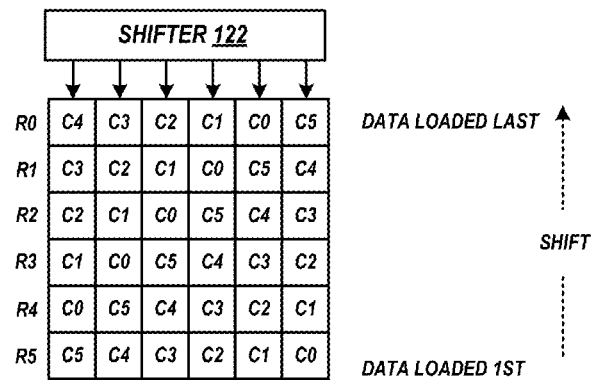
FIG. 6 depicts exemplary shifting of data words by an input shifter that are stored within a multidimensional storage array, according to various embodiments of the present invention.

FIG. 6 depicts exemplary shifting of data words by input shifter 122 that are stored within multidimensional storage array 116, according to various embodiments of the present invention. For example, data may be loaded into storage array 116 by for example, processor 101, decoder 126, etc. In certain embodiments the data loaded into storage array 116 is shifted by input shifter 122. A data word may be loaded into storage array 116 at a first series of row or column storage elements. For example, as shown in FIG. 6, a first data word may be loaded into storage elements addressed by C0R5, C1R5, C2R5, C3R5, C4R5, and C5R5, respectively. The first data word may be orientated to have a lowest order bit(s) in storage element with address C0R5.

A second data word may be shifted by input shifter 122 and loaded into storage elements addressed by C0R4, C1R4, C2R4, C3R4, C4R4, and C5R4, respectively. The second data word may be orientated to have a lowest order bit(s) in storage element with address C0R4. A third data word may be shifted by input shifter 122 and loaded into storage elements addressed by C0R3, C1R3, C2R3, C3R3, C4R3, and C5R3, respectively. The third data word may be orientated to have a lowest order bit(s) in storage element with address C0R3. A fourth data word may be shifted by input shifter 122 and loaded into storage elements addressed by C0R2, C1R2, C2R2, C3R2, C4R2, and C5R2, respectively.

The fourth data word may be orientated to have a lowest order bit(s) in storage element with address C0R2.

Subsequent data words may be further shifted by input shifter 122 and loaded into storage array 116 until a last data word is shifted by input shifter 122 and loaded into storage elements addressed by C0R0, C1R0, C2R0, C3R0, C4R0, and C5R0, respectively. The last data word may be orientated to have a lowest order bit(s) in storage element with address C0R0. As shown in FIG. 6 input shifter 122 may implement a variable length shift, circular shift, bitwise rotation, etc. wherein the orientation of serial data words is shifted by one position relative to a first data word or previous data word, respectively. In other embodiments, input shifter 122 may implement a variable length shift, bitwise rotation, etc. wherein the orientation of serial data words is shifted by more than one position relative to a first data word or previous data word, respectively.

In certain embodiments, input shifter 122 may be a digital circuit that can shift a data word by a specified number of bits in one clock cycle. It can be implemented as a sequence of multiplexers and in such an implementation the output of one multiplexer is connected to the input of the next multiplexer in a way that depends on the shift distance. For example, a four-bit input shifter 122 may shift a data word containing A, B, C and D. Input shifter 122 may cycle the order of the bits ABCD, DABC, CDAB, or BCDA. That input shifter 122 may make any cyclic combination of A, B, C and D. In certain embodiments, input shifter 122 includes a shift counter that is serially incremented upon data words being loaded into storage array 116. The input shifter 122 may utilize the shift counter to indicate a length of a cyclic shift of a next data word.

In certain embodiments, input shifter 122 implements a particular shift scheme to expose each column storage element and expose each row storage element such that an entire column data word or an entire row data word may be fed to the requesting device in a single hardware clock cycle.

Figure 7:
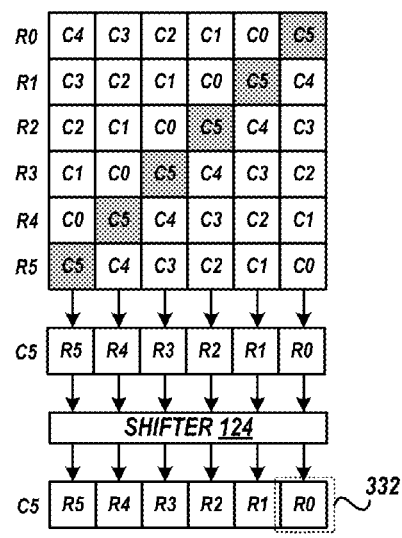
FIG. 7-FIG. 9 depict exemplary shifting of data words stored within multidimensional storage arrays by an output shifter, according to various embodiments of the present invention.

FIG. 7 depicts exemplary shifting of data words stored within multidimensional storage array 116 by an output shifter 124, according to various embodiments of the present invention. For example, data may be unloaded from storage array 116 and fed to for example, processor 101, decoder 126, etc. In certain embodiments the data unloaded from storage array 116 is shifted by output shifter 124. A data word may be unloaded from storage array 116 having either a row or column address. For example, as shown in FIG. 7, a column addressed data word may be unloaded from storage elements addressed by C5R5, C5R4, C5R3, C5R3, C5R1, and C5R0, respectively. The data word exiting storage array 116 may be shifted by output shifter 124 such that the lowest order bit(s) within the data word are located in the lowest order position 332. As shown in FIG. 7 the data word is arranged such that the lowest order bit(s) within the data word is located in the lowest order position 332. As such, shifter 124 need not shift the particular data word.

Figure 8:
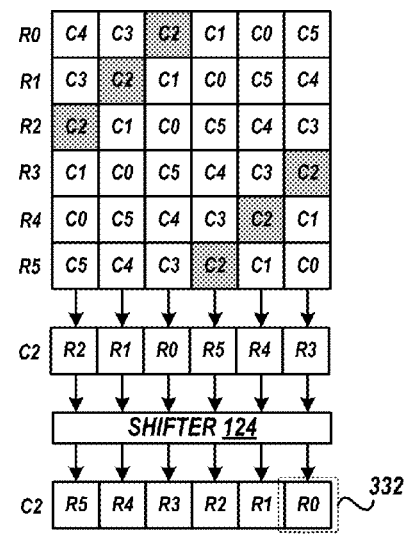

FIG. 8 depicts exemplary shifting of data words stored within multidimensional storage array 116 by an output shifter 124, according to various embodiments of the present invention. For example, as shown in FIG. 8, a column addressed data word may be unloaded from storage elements addressed by C2R2, C2R1, C2R0, C2R5, C2R4, and C2R3, respectively. The data word exiting storage array 116 may shifted by output shifter 124 such that the lowest order bit(s) within the data word are located in the lowest order position 332. For example, the bit(s) of the data word addressed at C2R0 prior to being shifted by output shifter 124 are at the lowest order position 332.

Figure 9:
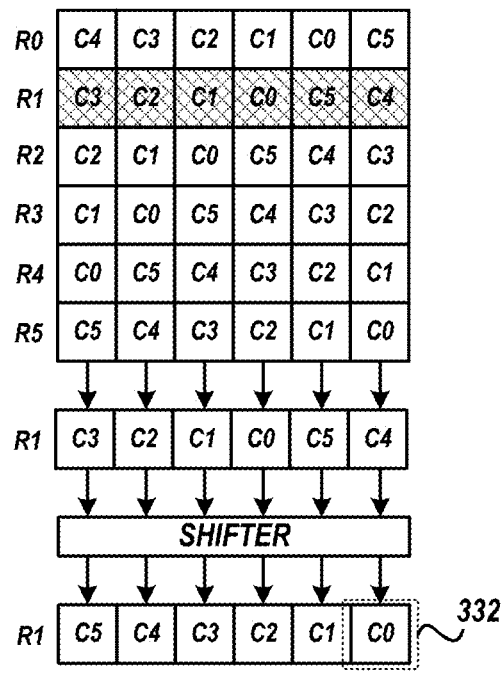

FIG. 9 depicts exemplary shifting of data words stored within multidimensional storage array 116 by an output shifter 124, according to various embodiments of the present invention. For example, as shown in FIG. 9, a row orientated data word may be unloaded from storage elements addressed by R1C3, R1C2, R1C1, R1C0, R1C5, and R1C4, respectively. The data word exiting storage array 116 may be shifted by output shifter 124 such that the lowest order bit(s) within the data word are located in the lowest order position 332. For example, the bit(s) of the data word at storage element R1C0 prior to being shifted by output shifter 124 are at the lowest order position 332.

Figure 10:
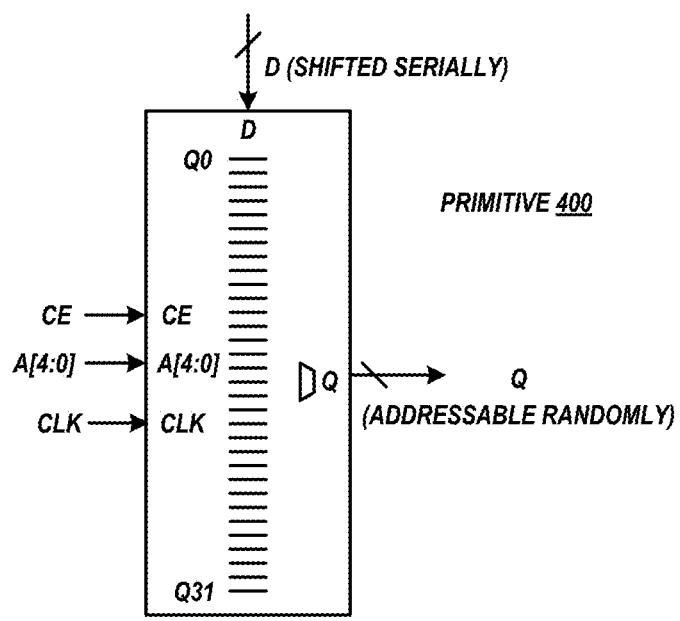
FIG. 10 depicts an exemplary storage primitive, according to various embodiments of the present invention.

FIG. 10 depicts an exemplary storage primitive, according to various embodiments of the present invention. Although the preceding description may utilize dual-ported memories to enable access of storage array 116, there are other means of achieving similar results. For example, a storage primitive 400 may function as a serial shift register for data entering the primitive. In certain implementations, primitive 400 may be a SRLC32E XILINX® primitive, available in field programmable gate array devices sold by Xilinx Inc.

Figure 11:
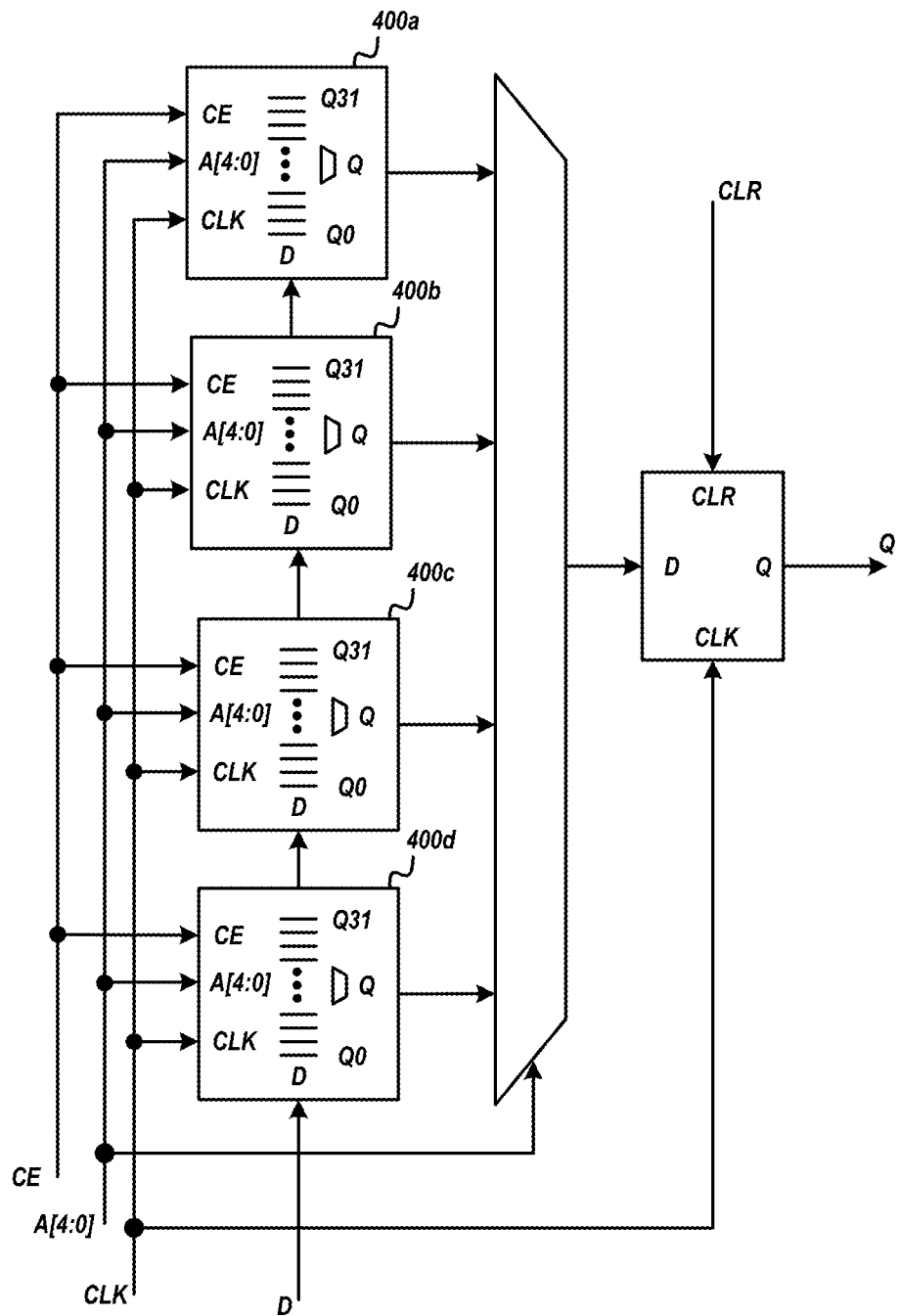
FIG. 11 depicts an exemplary concatenation of multiple storage primitives, according to various embodiments of the present invention.

Data may be written into primitive 400 by sequentially shifting the data into the memory instead of loading the data at a random address. Data may be read from primitive 400 via random access of a particular shift tap. Rows may be shifted sequentially into primitive 400, after which columns can be read diagonally from the storage array. Columns fed to the requesting device may be shifted serially into a second primitive 400, with rows being read diagonally from the second primitive. FIG. 11 depicts an exemplary concatenated storage primitive 400 scheme having multiple primitives 400.

Primitive 400 may be a variable length, 0 to 31 clock cycle shift register. Primitive 400 can be of a fixed length, static length, or dynamically adjusted by changing the address lines. Primitive 400 may include a shift depth selection (A[4:0]), active high clock enable (CE) and a clock input (CLK), and a cascading feature to support multiple primitives 400a-400d to be cascaded in order to create deeper memories. Q may be primitive 400 data output. A Q31 output of a primitive may connect to a D input of a subsequent primitive 400. D may be the primitive 400 data input. CLK may be a clock input. CE may be an active high clock enable. A[4:0] may be a dynamic depth selection of primitive 400. For instance, A=11111 may indicate a 32 bit shift. A=00000 may indicate a 1 bit shift.

Figure 12:
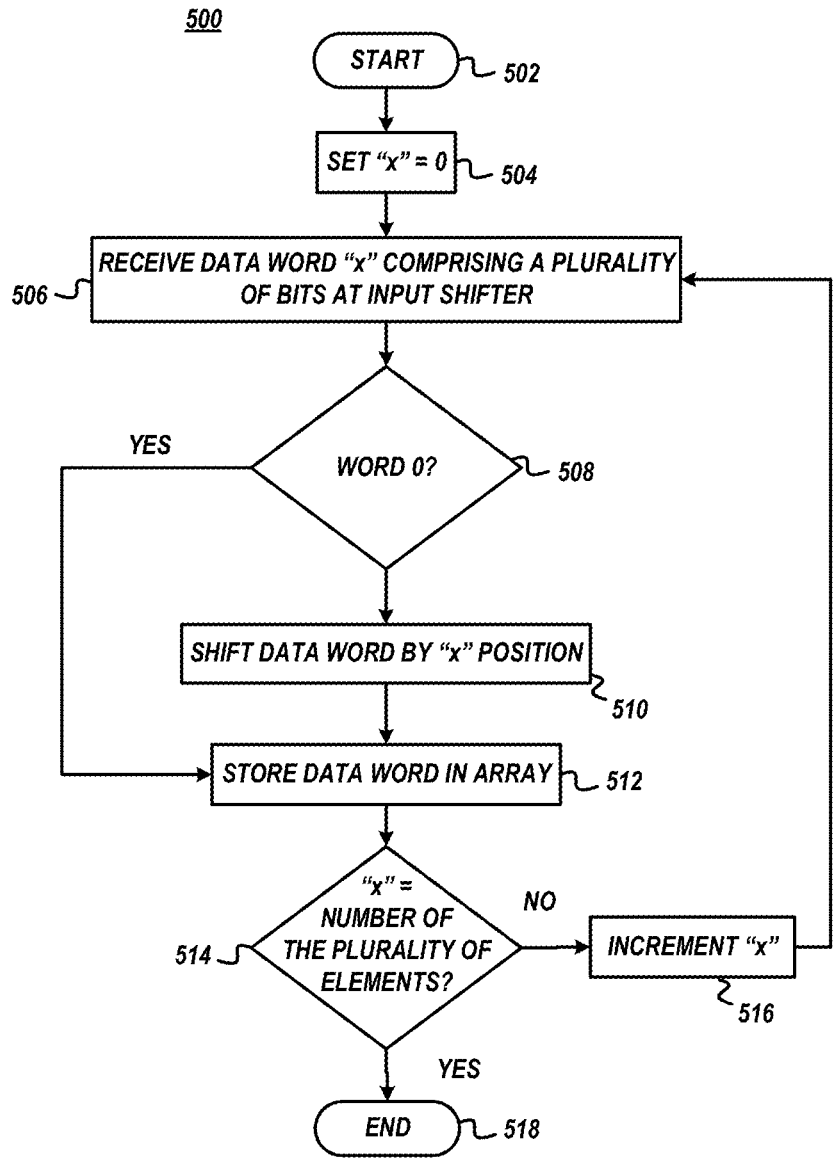
FIG. 12 depicts an exemplary block diagram of a method of loading data to a multidimensional storage array, according to various embodiments of the present invention.

FIG. 12 depicts an exemplary block diagram of a method 500 of loading data to a multidimensional storage array, according to various embodiments of the present invention. In various embodiments, method 500 may be implemented using a logic 119 module, shown in FIG. 1, etc. Method 500 begins at block 502 and continues with a variable "x" being set to 0 (block 504). For example, storage array 116 sets the variable "x" to 0. The variable "x" may be utilized as a counter in the iterative process of loading data into storage array 116.

Method 500 continues with input shifter 122 receiving data word x that includes a plurality of bits (block 506). For example, a row orientated data word or a column orientated data word may be received by an input shifter 122 included within data array 116. In another example, a data word may be received by an input shifter 122 included within another computer 100 component, such as processor 101.

Method 500 continues with input shifter 122 determining if the received data word is a first data word or word 0 (block 508). If this is the case, input shifter 122 loads or stores the first data word into storage array 116 (block 512). For example, a first row orientated data word may be loaded into row R0 of storage array 116 and/or a first column orientated data word may be loaded into column C0 of storage array 116.

If a first data word has previously been loaded into storage array 116, so that the received data word is not word 0 (NO at block 508), the input shifter 122 shifts the data word by "x" position (block 510). For example, input shifter 122 serially shifts incoming data words to expose column storage elements and expose row storage elements such that an entire column data word or an entire row data word may be fed to a requesting device in a single hardware clock cycle. For instance if the variable "x" is equal to 50, input shifter 122 may shift the bit positioning of the 51st data word by 50 places. Input shifter 122 may then load or store the shifted data word to storage array 116 (block 512).

In certain embodiments, input shifter 122 may determine if the variable "x" is equal to the number of storage elements within each row and column of storage array 116 (block 514). If the variable "x" does not equal the number of storage elements within each row and column of storage array 116, the variable "x" is incremented (block 516). Method 500 ends at block 518.

Figure 13:
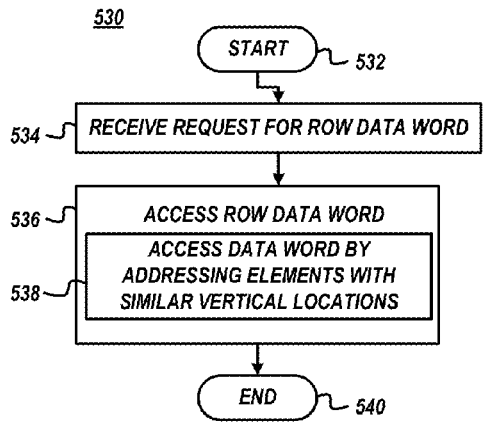
FIG. 13 depicts an exemplary block diagram of a method of accessing a row within a multidimensional storage array, according to various embodiments of the present invention.

FIG. 13 depicts an exemplary block diagram of a method 530 of accessing a row within a multidimensional storage array, according to various embodiments of the present invention. In various embodiments, method 530 may be implemented using logic 119 module, as shown in FIG. 1, etc. Method 530 begins at block 532 and continues with storage array 116 receiving a request sent from a requesting device such as processor 101 or decoder 126 for a row addressed data word stored within storage array 116 (block 534). Method 530 continues with storage array 116 (e.g. array manager 118, etc.) accessing the row address data word (block 536). In certain embodiments the requesting device accesses the row addressed data word directly. In certain embodiments the row addressed data word may be accessed by addressing storage elements within storage array 116 that have similar vertical locations or addresses (block 538). In certain embodiments, the row addressed data word is accessed by the requesting device in one hardware clock cycle. Method 530 ends at block 540.

Figure 14:
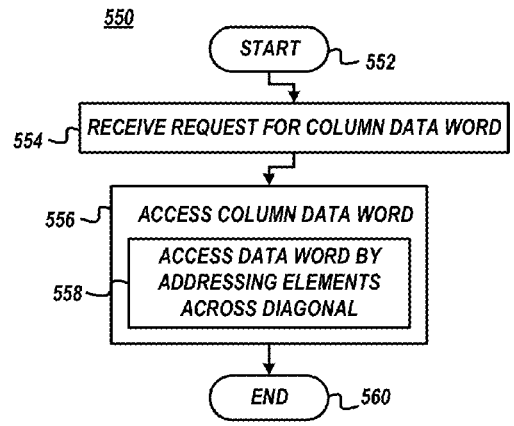
FIG. 14 depicts an exemplary block diagram of a method of accessing a column within a multidimensional storage array, according to various embodiments of the present invention.

FIG. 14 depicts an exemplary block diagram of a method 550 of accessing a column within a multidimensional storage array, according to various embodiments of the present invention. In various embodiments method 550 may be implemented using logic 119 module, as shown in FIG. 1, etc. Method 550 begins at block 552 and continues with storage array 116 receiving a request sent from a requesting device such as processor 101 or decoder 126 for a column addressed data word stored within storage array 116 (block 554). Method 550 continues with storage array 116 (e.g. array manager 118, etc.) accessing the column addressed data word (block 556). In certain embodiments the requesting device accesses the column addressed data word directly. In certain embodiments, the column addressed data word may be accessed by addressing storage elements within storage array 116 across diagonals or diagonal addresses (block 558). In certain embodiments, the column addressed data word is accessed by the requesting device in one hardware clock cycle. Method 550 ends at block 560.

Figure 15:
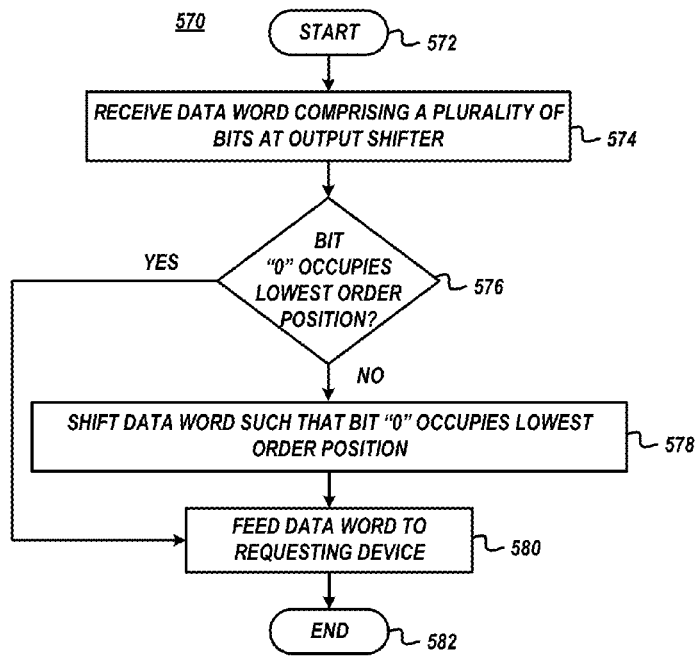
FIG. 15 depicts an exemplary block diagram of a method of unloading data from a multidimensional storage array, according to various embodiments of the present invention.

FIG. 15 depicts an exemplary block diagram of a method 570 of unloading data from a multidimensional storage array 116, according to various embodiments of the present invention. In various embodiments method 570 may be implemented using logic 119 module, as shown in FIG. 1, etc. Method 570 begins at block 572 and continues with output shifter 124 receiving a data word comprising a plurality of bits (block 574). For example, a data word may be received by an output shifter 124 included within data array 116. In another example, a data word may be received by an output shifter 124 included within another computer 100 component, such as processor 101.

Method 570 continues with output shifter 124 determining whether the received data word is orientated such that the lowest bit occupies the lowest order position (block 576). For example, the received data word may be orientated such that the lowest bit occupies the lowest order position if the received data word was the first row addressed data word or the first column addressed data word.

If the lowest bit does not occupy the lowest order position (i.e. the data word has been shifted by input shifter 122, etc.), the output shifter 124 shifts the received data word such that the lowest bit occupies the lowest order position (block 578). In certain embodiments, the output shifter 124 may determine the variable or count "x" associated with the length of input shift, and un-shift the received data word by a similar length "x." In certain embodiments, output shifter 124 undoes the shift implemented by the input shifter 122. Method 570 continues with storage array 116 feeding the data word to the requesting device (block 580). In certain embodiments storage array 116 may push the data word to the requesting device and in other embodiments the requesting device may pull the data word from storage array 116. In certain embodiments, the data word is accessed by the requesting device in one hardware clock cycle. Method 570 ends at block 582.

Figure 16:
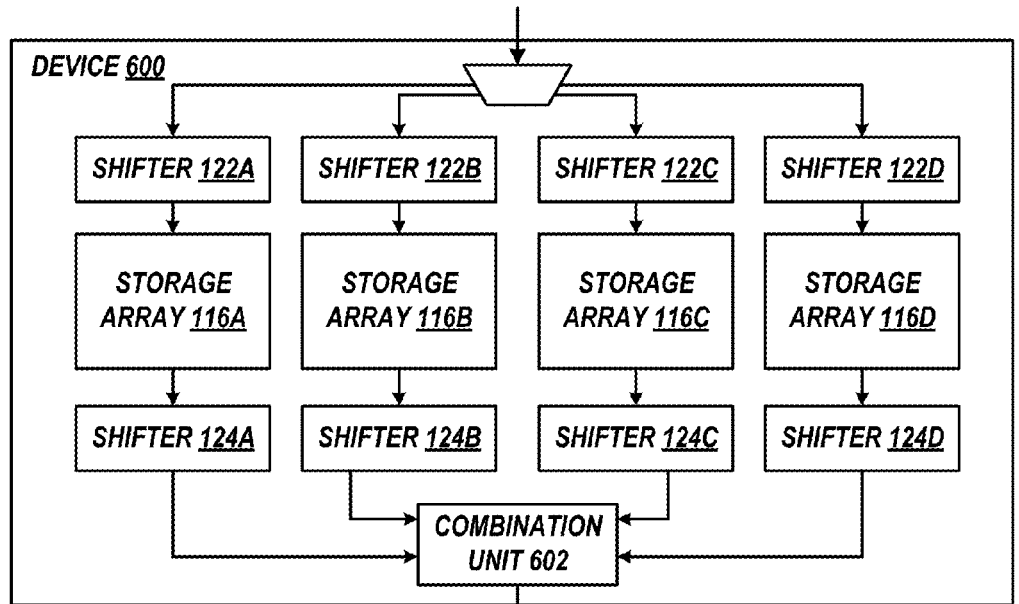
FIG. 16 depicts an exemplary block diagram of a semiconductor device that includes numerous multidimensional storage arrays, according to various embodiments of the present invention.

FIG. 16 depicts an exemplary block diagram of semiconductor device 600, e.g. an ASIC, FPGA, etc. that includes numerous multidimensional storage arrays 116A-116D, input shifters 122A-122D, and output shifters 124A-124D, according to various embodiments of the present invention. In certain embodiments, data words are logically partitioned into data sets wherein each data set contains "a" number of data parts, where "a" is equal to the number of storage arrays 116 within semiconductor device 600. To improve latency, multiple data parts may be loaded to separate storage arrays 116 in parallel. For example, a particular word may contain multiple data sets, each data set containing four data parts. A first data set may include R0C0, R0C1, R0C2, and R0C3 addressed data parts and a second data set may include R0C4, R0C5, R0C6, and R0C7 addressed data parts, etc. Data part R0C0 may be loaded to storage array 116a, data part R0C1 may be loaded to storage array 116b, data part R0C2 may be loaded to storage array 116c, data part R0C3 may be loaded to storage array 116d, data part R0C4 may be loaded to storage array 116a, data part R0C5 may be loaded to storage array 116b, data part R0C6 may be loaded to storage array 116c, data part R0C7 may be loaded to storage array 116d, etc.

Subsequent data words may be loaded to semiconductor device 600 utilizing a serial shift scheme wherein a second data word may be shifted by a position of 1 and second word data sets loaded to the various storage arrays 116, a third data word may be shifted by a position of 2 and third word data sets loaded to the various storage arrays 116, a fourth data word may be shifted by a position of 3 and fourth word data sets loaded to the various storage arrays 116, etc.

Data words may be unloaded by retrieving data parts of the data sets from each respective storage array 116. For example, data part R0C0 may be retrieved from storage array 116a, data part R0C1 may be retrieved from storage array 116b, data part R0C2 may be retrieved from storage array 116c, data part R0C3 may be retrieved from storage array 116d, data part R0C4 may be retrieved from storage array 116a, data part R0C5 may be retrieved from storage array 116b, data part R0C6 may be retrieved from storage array 116c, data part R0C7 may be retrieved from storage array 116d, etc. The various data sets may be combined by combination unit 602 to reform the data word. If the data word is in a shifted state, output shifter 124 (124A-124D) shifts the data word such that bit "0" occupies the lowest order position and the data word may be returned to the requesting device.

Figure 17:
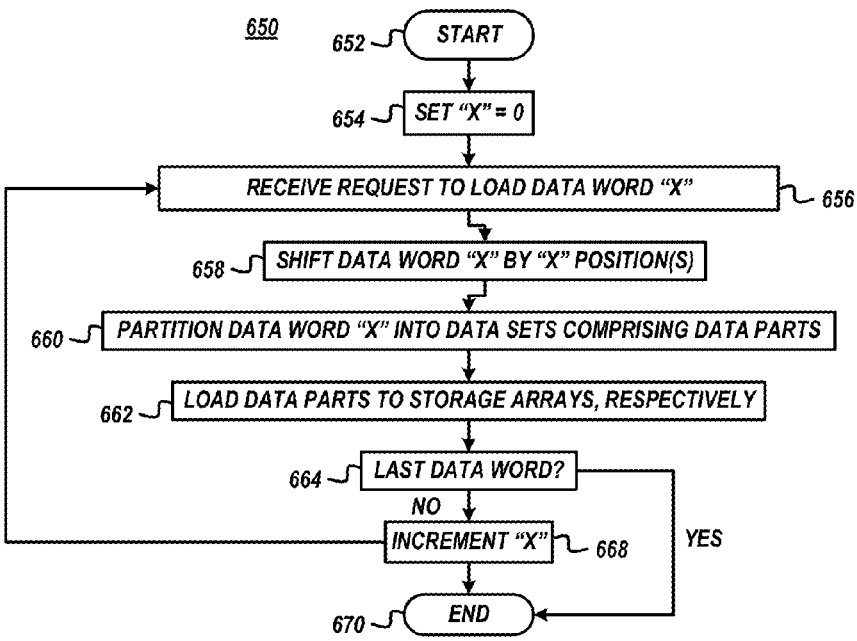
FIG. 17 depicts an exemplary block diagram of a method of loading data to a semiconductor device that includes numerous multidimensional storage arrays, according to various embodiments of the present invention.

FIG. 17 depicts an exemplary block diagram of a method 650 of loading data to semiconductor device 600 that includes numerous multidimensional storage arrays 116, according to various embodiments of the present invention. Method 650 begins at block 652 and continues with setting a variable "x" equal to zero (block 654). In certain embodiments the variable "x" may be associated with a counter utilized to determine the shift position implemented by input shifter 122 of serially loaded data words to semiconductor device 600.

Method 650 continues with semiconductor device 600 receiving a request to load data word "x" (block 654). For example, semiconductor device 600 may receive a request to load data word zero, data word thirty, etc. Input shifter 122 shifts the respective data words by "x" positions (block 658). For example, data word zero (i.e. the first data word) may not be shifted and subsequent data words may be shifted by input shifter 122 by "x" positions. Semiconductor device 600 may partition the data word into data sets (block 660). Each data set may comprise "y" number of data parts, where "y" equals the number of storage arrays 116 contained in semiconductor device 600. For example, if the semiconductor device 600 comprises four storage arrays 116, each data set comprise four data parts. In certain embodiments, a data part may be one bit of data and in other embodiments a data part may be multiple bytes of data.

Method 650 continues by loading data parts into respective storage arrays (block 662). For example, a first data part may be loaded into storage array 116a, a second data part may be loaded into storage array 116b, a third data part may be loaded into storage array 116c, and a fourth data part may be loaded into storage array 116d. A similar process is utilized to load the subsequent data sets until the entire data word is loaded. For example, a fifth data part may be loaded into storage array 116a, a sixth data part may be loaded into storage array 116b, a 7th data part may be loaded into storage array 116c, and an eighth data part may be loaded into storage array 116d, etc.

Method 650 continues by determining whether the loaded data word is the last data word (block 664) and if affirmative, method 650 ends at block 670. If the loaded data word is not the last data word, the variable "x" is incremented (block 668) and a subsequent data word is loaded by returning to block 656, wherein the subsequent data words are serially shifted by associated positions.

Figure 18:
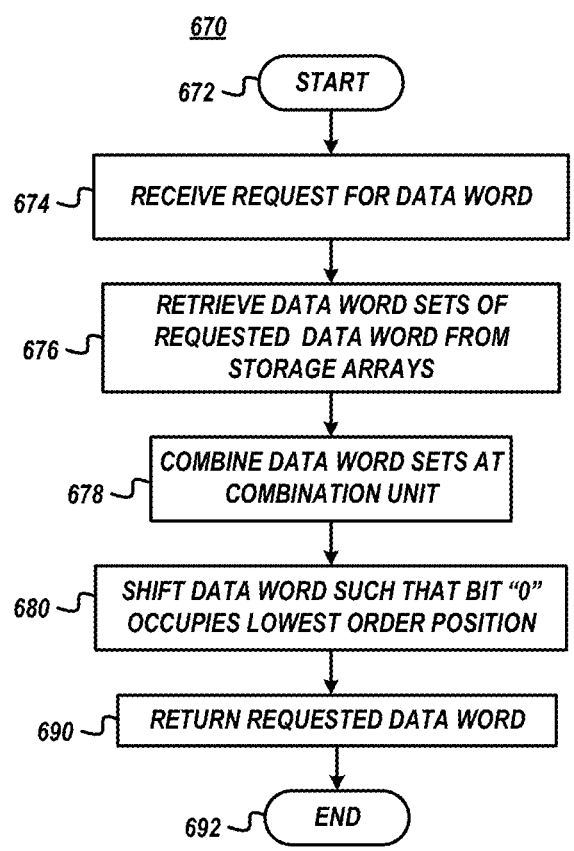
FIG. 18 depicts an exemplary block diagram of a method of unloading data from a semiconductor device that includes numerous multidimensional storage arrays, according to various embodiments of the present invention.

FIG. 18 depicts an exemplary block diagram of a method 670 of unloading data from semiconductor device 600 that includes numerous multidimensional storage arrays 116, according to various embodiments of the present invention. Method 670 begins at block 672 and continues with semiconductor device 600 receiving a request for a data word by a requesting device (block 674). Semiconductor device 600 retrieves the data word sets of the requested data word from the respective storage arrays 116 (block 676). For example, if a row addressed data word is requested, the semiconductor device 600 retrieves data parts across the various storage arrays 116 on a similar physical horizontal. If a column addressed data word is requested, the semiconductor device 600 retrieves data parts across the various storage arrays 116 across a physical diagonal.

Method 670 continues with the combination unit combining the data word sets to form a data word (block 678). Output shifter 124 may shift the data word such that bit "0" occupies the lowest order position (block 690). In other words, the output shifter reverses the shifts of the input shifter 122. Semiconductor device 600 then returns the requested data word to the requesting device (block 690). Method 670 ends at block 692.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A multidimensional storage array system comprising:
a multidimensional storage array comprising a plurality of independently addressable storage elements physically arranged in a plurality of rows and a plurality of columns that store particular bit(s) of a data word, each storage element consisting of a unique address;
an input shifter that implements a circular shift upon serially received data words and serially loads the circularly shifted data words to the multidimensional storage array at a storage array input interface filling the multidimensional storage array with multiple row addressed data words and multiple column addressed data words, the input shifter exposing column addressed bit(s) and row addressed bit(s) of the circularly shifted data words to a storage array output interface such that the independently addressable storage elements that store any particular circularly shifted row addressed data word or circularly shifted column addressed data word are exposed to the storage array output interface, wherein the storage array input interface is a first interface of the multidimensional storage array that which circularly shifted data words pass into the multidimensional storage array;

an output shifter that reverses the circular shift of data words unloaded from the multidimensional storage array; wherein the exposed column addressed bit(s) and row addressed bit(s) of the circularly shifted data words enable an entire column addressed data word or an entire row addressed data word to be unloaded from the storage array output interface in a single clock cycle; and a decoder that requests and receives the entire column addressed data word or the entire row addressed data word from the output shifter, corrects an error within the entire column addressed data word or the entire row addressed data word, and returns the corrected entire column addressed data word or the entire row addressed data word to the multidimensional storage array via the input shifter, wherein the decoder iteratively requests and returns all row addressed data words within the multidimensional storage array and subsequently requests and returns all column addressed data words within the multidimensional storage array.

2. The multidimensional storage array of claim 1, wherein the column addressed data words are stored in a plurality of diagonally arranged independently addressable storage elements.

3. The multidimensional storage array of claim 1, wherein the row addressed data words are stored in a plurality of horizontally arranged independently addressable storage elements.

4. A multidimensional storage array access method comprising:
serially receiving, with an input shifter, a plurality of data words;
circularly shifting, with the input shifter, the serially received data words;
loading, with the input shifter, the circularly shifted data words to a multidimensional storage array at a storage array input interface filling the multidimensional storage array with multiple row addressed data words and multiple column addressed data words, the multidimensional storage array comprising a plurality of independently addressable storage elements physically arranged in a plurality of rows and a plurality of columns, each storage element consisting of a unique address, the input shifter exposing column addressed bit(s) and row addressed bit(s) of the circularly shifted data words to a storage array output interface such that the independently addressable storage elements that store any particular circularly shifted data word are exposed to the storage array output interface, wherein the storage array input interface is a first interface of the multidimensional storage array that which circularly shifted data words pass into the multidimensional storage array;
unloading circularly shifted data words from the multidimensional storage array at a storage array output interface, wherein the storage array output interface is a second interface of the multidimensional storage array that which circularly shifted data words pass from the multidimensional storage array;
reversing, with an output shifter, the circular shift of the circularly shifted data words, wherein the exposed column addressed bit(s) and the exposed row addressed bit(s) of the circularly shifted data words enable an entire column addressed data word or an entire row addressed data word to be unloaded from the storage array output interface in a single clock cycle;

receiving, with a decoder, the entire column addressed data word or the entire row addressed data word from the output shifter;
correcting, with the decoder, an error within the entire column addressed data word or the entire row addressed data word; and
returning, with the decoder, the corrected entire column addressed data word or the entire row addressed data word to the multidimensional storage array via the input shifter, whereby the decoder iteratively requests and returns all row addressed data words within the multidimensional storage array and subsequently requests and returns all column addressed data words within the multidimensional storage array.

5. The multidimensional storage array access method of claim 4, wherein a column addressed data word is stored in a plurality of diagonally arranged independently addressable storage elements.

6. The multidimensional storage array access method of claim 4, wherein a row addressed data word is stored in a plurality of horizontally arranged independently addressable storage elements.

7. The multidimensional storage array access method of claim 4 wherein a first circularly shifted data word is loaded to the multidimensional storage array simultaneously to a second circularly shifted data word being unloaded from the multidimensional storage array.

8. A computer program product for accessing a multidimensional storage array, the computer program product comprising a computer readable storage medium having program code embodied therewith, the program code executable to:
serially receive, with an input shifter, a plurality of data words;
circularly shift, with the input shifter, the serially received data words;
load, with the input shifter, the circularly shifted data words to a multidimensional storage array at a storage array input interface filling the multidimensional storage array with multiple row addressed data words and multiple column addressed data words, the multidimensional storage array comprising a plurality of independently addressable storage elements physically arranged in a plurality of rows and a plurality of columns, each storage element consisting of a unique address, the input shifter exposing column addressed bit(s) and row addressed bit(s) of the circularly shifted data words to a storage array output interface such that the independently addressable storage elements that store any particular circularly shifted data word are exposed to the output interface, wherein the storage array input interface is a first interface of the multidimensional storage array that which circularly shifted data words pass into the multidimensional storage array;
unload circularly shifted data words from the multidimensional storage array at a storage array output interface, wherein the storage array output interface is a second interface of the multidimensional storage array that which circularly shifted data words pass from the multidimensional storage array, and;
reverse, with an output shifter, the circular shift of the circularly shifted data words, wherein the exposed column addressed bit(s) and the exposed row addressed bit(s) of the circularly shifted data words enables an entire column addressed data word or an entire row addressed data word to be unloaded from the storage array output interface in a single clock cycle;

receive, with a decoder, the entire column addressed data word or the entire row addressed data word from the output shifter;

correct, with the decoder, an error within the entire column addressed data word or the entire row addressed data word; and returning return, with the decoder, the corrected entire column addressed data word or the entire row addressed data word to the multidimensional storage array via the input shifter, whereby the decoder iteratively requests and returns all row addressed data words within the multidimensional storage array and subsequently requests and returns all column addressed data words within the multidimensional storage array.

9. The computer program product for accessing a multidimensional storage array of claim 8, wherein the program code is further executable to:

simultaneously load a first circularly shifted data word to the multidimensional storage array and unload a second circularly shifted data word from the multidimensional storage array.

* * * * *